United States Patent
Bykampadi et al.

(10) Patent No.: US 10,548,004 B2
(45) Date of Patent: Jan. 28, 2020

(54) SECURITY MANAGEMENT IN COMMUNICATION SYSTEMS BETWEEN SECURITY EDGE PROTECTION PROXY ELEMENTS

(71) Applicant: Nokia Technologies Oy, Espoo (FI)

(72) Inventors: Nagendra S. Bykampadi, Bangalore (IN); Suresh P. Nair, Whippany, NJ (US); Anja Jerichow, Munich (DE)

(73) Assignee: Nokia Technologies OY, Espoo (FI)

(*) Notice: Subject to any disclaimer, the term of this patent is extended or adjusted under 35 U.S.C. 154(b) by 0 days.

(21) Appl. No.: 16/014,219

(22) Filed: Jun. 21, 2018

(65) Prior Publication Data
US 2019/0253885 A1 Aug. 15, 2019

(30) Foreign Application Priority Data
Feb. 15, 2018 (IN) .............................. 201841005881

(51) Int. Cl.
| | | |
|---|---|---|
| *H04W 12/02* | (2009.01) | |
| *H04L 29/06* | (2006.01) | |
| *H04W 12/06* | (2009.01) | |
| *H04W 84/04* | (2009.01) | |
| *H04W 84/12* | (2009.01) | |

(52) U.S. Cl.
CPC ......... *H04W 12/02* (2013.01); *H04L 63/0281* (2013.01); *H04L 63/04* (2013.01); *H04L 63/166* (2013.01); *H04L 63/205* (2013.01); *H04W 12/06* (2013.01); *H04W 84/042* (2013.01); *H04W 84/12* (2013.01)

(58) Field of Classification Search
CPC ..... H04W 12/04; H04W 12/02; H04W 12/06; H04W 12/08
USPC .......................... 455/410, 411; 370/252, 352
See application file for complete search history.

(56) References Cited

FOREIGN PATENT DOCUMENTS

WO PCT/FI2019/050104 2/2019

OTHER PUBLICATIONS

Nokia, Deutsche Telekom AG, "Interconnection End-To-End Security for SBA," 3rd Generation Partnership Project (3GPP) TSG SA WG3 (Security), Meeting #89, Nov. 27-Dec. 1, 2017, 4 pages.
Ericsson, "Comment Contribution to S3-180223 (LS to CT3 CT4 on SBI Design and Its Security Implications)," 3rd Generation Partnership Project (3GPP) TSG SA WG3 (Security), Meeting #90, Gothenburg, Sweden, Jan. 22-26, 2018, 5 pages.
Hans Christian Rudolph, S3-180389, "LS on SBI Design and Its Security Implications," 3rd Generation Partnership Project (3GPP) TSG SA WG3 (Security), Meeting #90, Gothenburg, Sweden, Jan. 22-26, 2018, 3 pages.

(Continued)

*Primary Examiner* — Sam Bhattacharya
(74) *Attorney, Agent, or Firm* — Ryan, Mason & Lewis, LLP

(57) ABSTRACT

In a communication system comprising a first network operatively coupled to a second network, wherein the first network comprises a first security edge protection proxy element operatively coupled to a second security edge protection proxy element of the second network, a method comprises configuring at least a given one of the first and second security edge protection proxy elements to determine whether to apply at least one security operation at the transport level for incoming packets based at least in part on source and destination networks for the incoming packets.

20 Claims, 4 Drawing Sheets

(56) References Cited

OTHER PUBLICATIONS

Tim, "Analysis of Different Approaches for Implementing SBA Security Over N32 Reference Point," 3rd Generation Partnership Project (3GPP) TSG SA WG3 (Security), Meeting #90, Gothenburg, Sweden, Jan. 22-26, 2018, 5 pages.
3GPP, "3rd Generation Partnership Project; Technical Specification Group Services and System Aspects; System Architecture for the 5G System; Stage 2 (Release 15)," 3GPP TS 23.501, V15.0.0, Dec. 2017, 181 pages.
3GPP, "3rd Generation Partnership Project; Technical Specification Group Services and System Aspects; Security Architecture and Procedures for 5G System (Release 15)," 3GPP TS 33.501, V0.7.0, Jan. 2018, 109 pages.
D. Hardt, Ed., "The OAuth 2.0 Authorization Framework," Internet Engineering Task Force (IETF) Request for Comments: 6749, https://tools.ietf.org/html/rfc6749, Oct. 2012, 77 pages.
M. Jones et al., "JSON Web Token (JWT)," Internet Engineering Task Force (IETF) Request for Comments: 7519, https://tools.ietf.org/html/rfc7519, May 2015, 31 pages.
M. Jones et al., "JSON Web Signature (JWS)," Internet Engineering Task Force (IETF) Request for Comments: 7515, https://tools.ietf.org/html/rfc7515, May 2015, 60 pages.
M. Jones et al., "JSON Web Encryption (JWE)," Internet Engineering Task Force (IETF) Request for Comments: 7516, https://tools.ietf.org/html/rfc7516, May 2015, 52 pages.
M. Jones et al., "The OAuth 2.0 Authorization Framework: Bearer Token Usage," Internet Engineering Task Force (IETF) Request for Comments: 6750, https://tools.ietf.org/html/rfc6750, Oct. 2012, 19 pages.

SECURITY MANAGEMENT IN COMMUNICATION SYSTEMS BETWEEN SECURITY EDGE PROTECTION PROXY ELEMENTS

FIELD

The field relates generally to communication systems, and more particularly, but not exclusively, to security management within such systems.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

In an example communication system, user equipment (5G UE in a 5G network or, more broadly, a UE) such as a mobile terminal (subscriber) communicates over an air interface with a base station or access point referred to as a gNB in a 5G network. The access point (e.g., gNB) is illustratively part of an access network of the communication system. For example, in a 5G network, the access network is referred to as a 5G System and is described in 5G Technical Specification (TS) 23.501, V15.0.0, entitled "Technical Specification Group Services and System Aspects; System Architecture for the 5G System," the disclosure of which is incorporated by reference herein in its entirety. In general, the access point (e.g., gNB) provides access for the UE to a core network (CN), which then provides access for the UE to other UEs and/or a data network such as a packet data network (e.g., Internet).

TS 23.501 goes on to define a 5G Service-Based Architecture (SBA) which models services as network functions (NFs) that communicate with each other using representational state transfer application programming interfaces (Restful APIs).

Furthermore, 5G Technical Specification (TS) 33.501, V0.7.0, entitled "Technical Specification Group Services and System Aspects; Security Architecture and Procedures for the 5G System," the disclosure of which is incorporated by reference herein in its entirety, further describes security management details associated with a 5G network.

Security management is an important consideration in any communication system. However, due to continuing attempts to improve the architectures and protocols associated with a 5G network in order to increase network efficiency and/or subscriber convenience, security management issues can present a significant challenge.

SUMMARY

Illustrative embodiments provide improved techniques for security management in communication systems.

For example, in one illustrative embodiment, a method comprises, in a communication system comprising a first network operatively coupled to a second network, wherein the first network comprises a first security edge protection proxy element operatively coupled to a second security edge protection proxy element of the second network, configuring at least a given one of the first and second security edge protection proxy elements to determine whether to apply at least one security operation at the transport level for incoming packets based at least in part on source and destination networks for the incoming packets.

Further illustrative embodiments are provided in the form of non-transitory computer-readable storage medium having embodied therein executable program code that when executed by a processor causes the processor to perform the above steps. Still further illustrative embodiments comprise apparatus with a processor and a memory configured to perform the above steps.

These and other features and advantages of embodiments described herein will become more apparent from the accompanying drawings and the following detailed description.

DETAILED DESCRIPTION

Embodiments will be illustrated herein in conjunction with example communication systems and associated techniques for providing security management in communication systems. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP next generation system (5G), the disclosed embodiments can be adapted in a straightforward manner to a variety of other types of communication systems.

In accordance with illustrative embodiments implemented in a 5G communication system environment, one or more 3GPP technical specifications (TS) and technical reports (TR) may provide further explanation of network elements/functions and/or operations that may interact with parts of the inventive solutions, e.g., the above-referenced 3GPP TS 23.501 and 3GPP TS 33.501. Other 3GPP TS/TR documents may provide other conventional details that one of ordinary skill in the art will realize. However, while well-suited for 5G-related 3GPP standards, embodiments are not necessarily intended to be limited to any particular standards.

Illustrative embodiments are related to security management associated with the Service-Based Architecture (SBA) for 5G networks. Prior to describing such illustrative embodiments, a general description of main components of a 5G network will be described below in the context of FIGS. 1 and 2.

Figure 1:
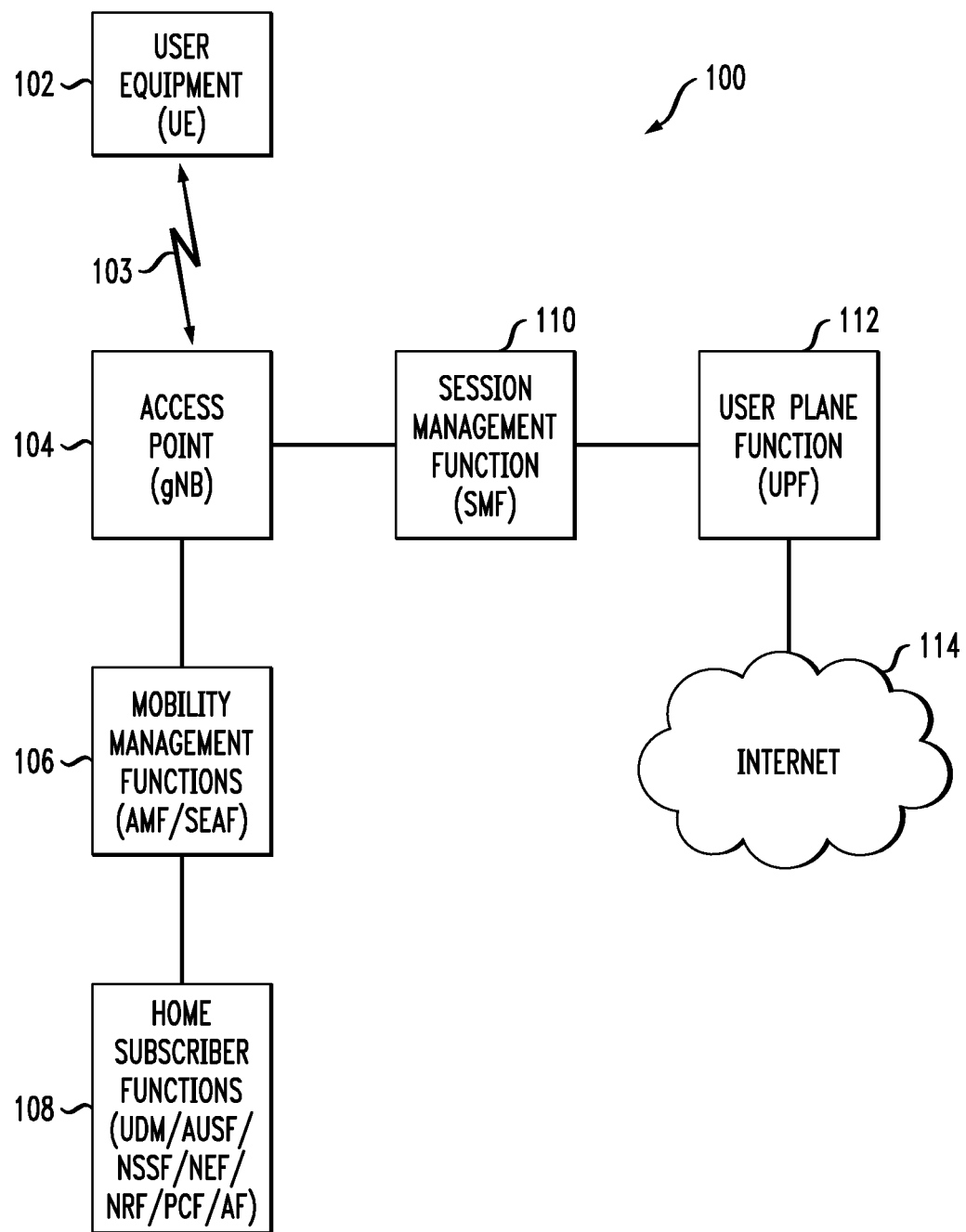
FIG. 1 illustrates a communication system with which one or more illustrative embodiments may be implemented.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in 5G networks that provide these main functions. However, other network elements may be used to implement some or all of the main functions represented. Also, it is to be understood that not all functions of a 5G network are depicted in FIG. 1. Rather, functions that facilitate an explanation of illustrative embodiments are represented. Subsequent figures may depict some additional elements/functions.

Accordingly, as shown, communication system 100 comprises user equipment (UE) 102 that communicates via an air interface 103 with an access point (gNB) 104. The UE 102 may be a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment such as a smart phone. Such communication devices are also intended to encompass devices commonly referred to as access terminals.

In one embodiment, UE 102 is comprised of a Universal Integrated Circuit Card (UICC) part and a Mobile Equipment (ME) part. The UICC is the user-dependent part of the UE and contains at least one Universal Subscriber Identity Module (USIM) and appropriate application software. The USIM securely stores the permanent subscription identifier and its related key, which are used to identify and authenticate subscribers to access networks. The ME is the user-independent part of the UE and contains terminal equipment (TE) functions and various mobile termination (MT) functions.

Note that, in one example, the permanent subscription identifier is an International Mobile Subscriber Identity (IMSI) of a UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN). In a 5G communication system, an IMSI is referred to as a Subscription Permanent Identifier (SUPI). In the case of an IMSI as a SUPI, the MSIN provides the subscriber identity. Thus, only the MSIN portion of the IMSI typically needs to be encrypted. The MNC and MCC portions of the IMSI provide routing information, used by the serving network to route to the correct home network. When the MSIN of a SUPI is encrypted, it is referred to as Subscription Concealed Identifier (SUCI).

The access point 104 is illustratively part of an access network of the communication system 100. Such an access network may comprise, for example, a 5G System having a plurality of base stations and one or more associated radio network control functions. The base stations and radio network control functions may be logically separate entities, but in a given embodiment may be implemented in the same physical network element, such as, for example, a base station router or femto cellular access point.

The access point 104 in this illustrative embodiment is operatively coupled to mobility management functions 106. In a 5G network, the mobility management function is implemented by an Access and Mobility Management Function (AMF). A Security Anchor Function (SEAF) can also be implemented with the AMF connecting a UE with the mobility management function. A mobility management function, as used herein, is the element or function (i.e., entity) in the core network (CN) part of the communication system that manages or otherwise participates in, among other network operations, access and mobility (including authentication/authorization) operations with the UE (through the access point 104). The AMF may also be referred to herein, more generally, as an access and mobility management entity.

The AMF 106 in this illustrative embodiment is operatively coupled to home subscriber functions 108, i.e., one or more functions that are resident in the home network of the subscriber. As shown, some of these functions include the Unified Data Management (UDM) function, as well as an Authentication Server Function (AUSF). The AUSF and UDM (separately or collectively) may also be referred to herein, more generally, as an authentication entity. In addition, home subscriber functions may include, but are not limited to, Network Slice Selection Function (NSSF), Network Exposure Function (NEF), Network Repository Function (NRF), Policy Control Function (PCF), and Application Function (AF).

The access point 104 is also operatively coupled to a serving gateway function, i.e., Session Management Function (SMF) 110, which is operatively coupled to a User Plane Function (UPF) 112. UPF 112 is operatively coupled to a Packet Data Network, e.g., Internet 114. Further typical operations and functions of such network elements are not described here since they are not the focus of the illustrative embodiments and may be found in appropriate 3GPP 5G documentation.

It is to be appreciated that this particular arrangement of system elements is an example only, and other types and arrangements of additional or alternative elements can be used to implement a communication system in other embodiments. For example, in other embodiments, the system 100 may comprise other elements/functions not expressly shown herein.

Accordingly, the FIG. 1 arrangement is just one example configuration of a wireless cellular system, and numerous alternative configurations of system elements may be used. For example, although only single elements/functions are shown in the FIG. 1 embodiment, this is for simplicity and clarity of description only. A given alternative embodiment may of course include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions)

comprise a series of network function (NF) sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via gNB 104.

Figure 2:
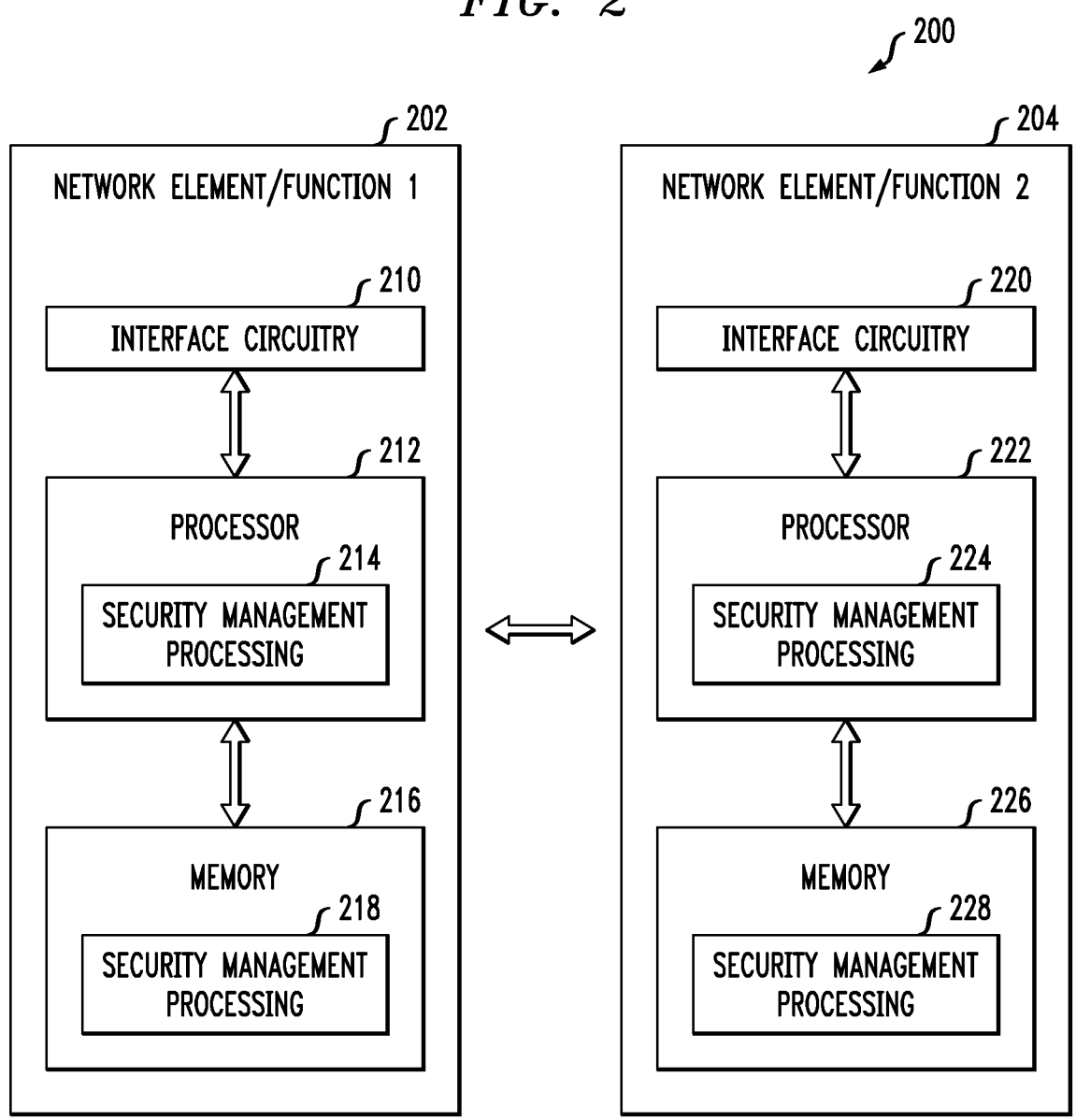
FIG. 2 illustrates network elements/functions for providing security management with which one or more illustrative embodiments may be implemented.

FIG. 2 is a block diagram of network elements/functions for providing security management in an illustrative embodiment. System 200 is shown comprising a first network element/function 202 and a second network element/function 204. It is to be appreciated that the network elements/functions 202 and 204 represent any network elements/functions that are configured to provide security management and other techniques described herein, for example, but not limited to, AMF, SEAF, UDM, AUSF, NSSF, NEF, NRF, PCF and AF. Further, one or both of the first network element/function 202 and the second network element/function 204 may be a Security Edge Protection Proxy (SEPP), which will be described in further detail below.

The network element/function 202 comprises a processor 212 coupled to a memory 216 and interface circuitry 210. The processor 212 of the network element/function 202 includes a security management processing module 214 that may be implemented at least in part in the form of software executed by the processor. The processing module 214 performs security management described in conjunction with subsequent figures and otherwise herein. The memory 216 of the network element/function 202 includes a security management storage module 218 that stores data generated or otherwise used during security management operations.

The network element/function 204 comprises a processor 222 coupled to a memory 226 and interface circuitry 220. The processor 222 of the network element/function 204 includes a security management processing module 224 that may be implemented at least in part in the form of software executed by the processor 222. The processing module 224 performs security management described in conjunction with subsequent figures and otherwise herein. The memory 226 of the network element/function 204 includes a security management storage module 228 that stores data generated or otherwise used during security management operations.

The processors 212 and 222 of the respective network elements/functions 202 and 204 may comprise, for example, microprocessors, application-specific integrated circuits (ASICs), field programmable gate arrays (FPGAs), digital signal processors (DSPs) or other types of processing devices or integrated circuits, as well as portions or combinations of such elements. Such integrated circuit devices, as well as portions or combinations thereof, are examples of "circuitry" as that term is used herein. A wide variety of other arrangements of hardware and associated software or firmware may be used in implementing the illustrative embodiments.

The memories 216 and 226 of the respective network elements/functions 202 and 204 may be used to store one or more software programs that are executed by the respective processors 212 and 222 to implement at least a portion of the functionality described herein. For example, security management operations and other functionality as described in conjunction with subsequent figures and otherwise herein may be implemented in a straightforward manner using software code executed by processors 212 and 222.

A given one of the memories 216 or 226 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

The memory 216 or 226 may more particularly comprise, for example, an electronic random access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 210 and 220 of the respective network elements/functions 202 and 204 illustratively comprise transceivers or other communication hardware or firmware that allows the associated system elements to communicate with one another in the manner described herein.

It is apparent from FIG. 2 that network element/function 202 is configured for communication with network element/function 204 and vice-versa via their respective interface circuitries 210 and 220. This communication involves network element/function 202 sending data to the network element/function 204, and the network element/function 204 sending data to the network element/function 202. However, in alternative embodiments, other network elements may be operatively coupled between the network elements/functions 202 and 204. The term "data" as used herein is intended to be construed broadly, so as to encompass any type of information that may be sent between network elements/functions (as well as between user equipment and a core network) including, but not limited to, messages, identifiers, keys, indicators, user data, control data, etc.

It is to be appreciated that the particular arrangement of components shown in FIG. 2 is an example only, and numerous alternative configurations may be used in other embodiments. For example, any given network element/function can be configured to incorporate additional or alternative components and to support other communication protocols.

Other system elements such as UE 102 and gNB 104 may each also be configured to include components such as a processor, memory and network interface. These elements need not be implemented on separate stand-alone processing platforms, but could instead, for example, represent different functional portions of a single common processing platform.

Given the general concepts described above, illustrative embodiments that address certain security management issues will now be described. More particularly, illustrative embodiments provide security management techniques for 5G systems. The architecture for 5G systems is currently being standardized in 3GPP. As mentioned above, the 3GPP TS 23.501 defines the 5G system architecture as service-based, e.g., Service-Based Architecture (SBA).

Figure 3:
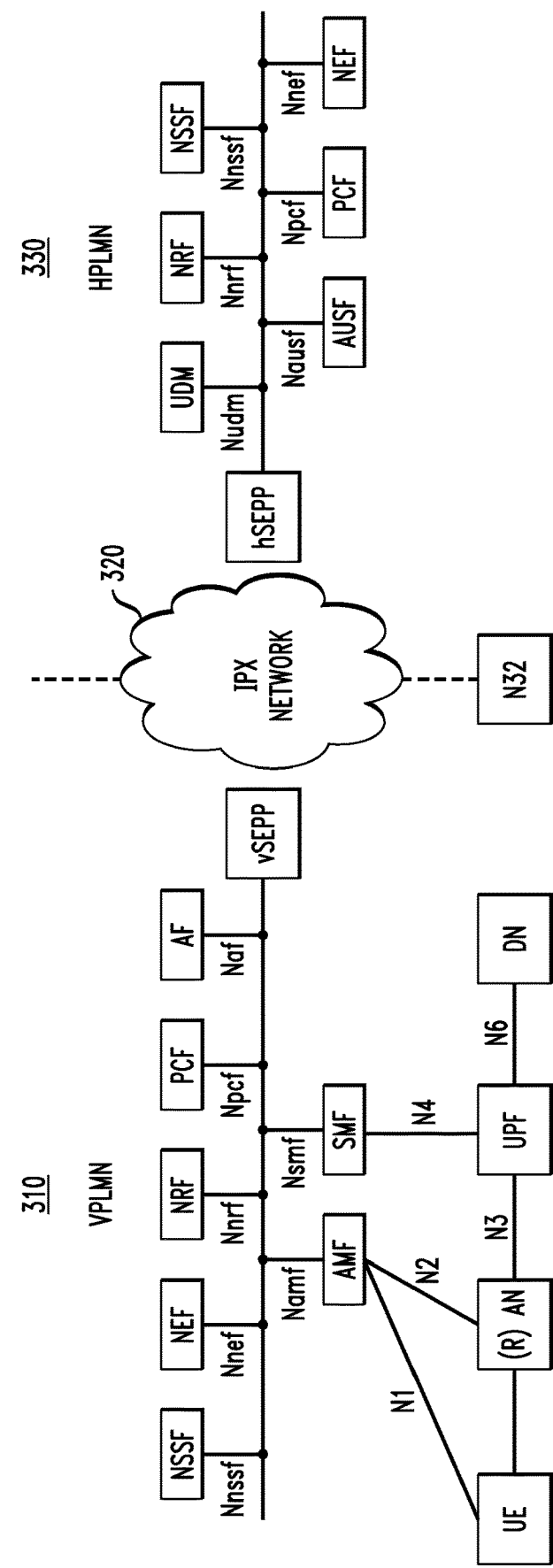
FIG. 3 illustrates a communication system architecture with security edge protection proxies between a visiting network and a home network with which one or more illustrative embodiments may be implemented.

FIG. 3 depicts a 5G architecture in a configuration comprising a visiting public land mobile network (VPLMN) 310 operatively coupled via an intermediate Internetwork Packet Exchange (IPX) network 320 to a home public land mobile network (HPLMN) 330. More particularly, FIG. 3 illustrates the presence of a Security Edge Protection Proxy (SEPP) at the edge of each PLM network (e.g., vSEPP in VPLMN 310 and hSEPP in HPLMN 330). It is to be appreciated that the various network functions shown in the VPLMN 310 and the HPLMN 330 are known and described in detail in various 5G specifications such as, but not limited to, the above-referenced TS 23.501 and TS 33.501.

Thus, the SEPP is the entity that resides at the perimeter of the network and performs security on HyperText Transport Protocol (HTTP) messages before the messages are sent externally over a roaming interface (e.g., N32). The security may be Transport Layer Security (TLS), Application Layer Security (ALS) (e.g., which may be performed individually on each information element (IE) in the HTTP Request message using a standardized JavaScript Object Signing and Encryption (JOSE) framework), etc.

In 5G, SBA is introduced to model services as network functions (NFs) that communicate with each other using Restful APIs. In the scenario where the two communicating NFs are in two different PLMNs (e.g., VPLMN 310 and HPLMN 330), communication happens over the roaming interface between the two participating PLMNs. In the 5G SBA, the SEPP sits at the edge of the PLMN network (e.g., at the edge of the VPLMN 310 or HPLMN 330 in FIG. 3). As defined in TS 23.501 6.2.17, the SEPP is a non-transparent proxy that supports functionality for: (i) message filtering and policing on inter-PLMN control plane interfaces; and (ii) topology hiding.

Since the SEPP is a proxy, no service-based interface is needed. Hence in inter-PLMN communications, the SEPP should do topology hiding of the PLMN it is proxying. For this topology it is expected to be a "non-transparent" active proxy, which parses the messages passing through it and hides sensitive information. The SEPP behaves as a "non-transparent" proxy in that the NFs are aware of the SEPP and send all inter-PLMN control plane traffic to their local SEPP. The connection between the NF and its local SEPP may be secured with TLS. Techniques are needed for achieving this topology hiding and UE security keeping the UE identity private from the IPX interconnect nodes between the two PLMNs.

In the outgoing direction (i.e., from a NF within its PLMN to another PLMN), the SEPP does topology hiding by not exposing any of the intra-PLMN IP addresses and topology information in the outgoing traffic. In addition, the SEPP secures all outgoing traffic by either using TLS at the transport layer to secure all traffic, or by securing all or some NF control plane traffic (i.e., JavaScript Object Notation (JSON) Information Elements (IEs) in the HTTP message payload). Apart from this, the SEPP can also implement identity hiding by securing the Permanent Subscriber Identity (SUPI) information in the request uniform resource identifier (URI) field of the HTTP Request line.

In the incoming direction (i.e., from another PLMN to the NF within its PLMN), the SEPP receives all the traffic addressed to it, as the SEPP is the proxy for its PLMN. The SEPP forwards the received traffic to the correct NF based on the request URI. In this process, it restores the protected message to its original form before forwarding it to the correct NF. The SEPP performs access control by only allowing traffic from authorized or authenticated entities (i.e., peer SEPP on the other side of the N32 roaming interface).

As mentioned above, in 5G SBA is introduced to model services as NFs that communicate with each other using Restful APIs. In the scenario where the two communicating NFs are in two different PLMNs (e.g., VPLMN 310 and HPLMN 330), communication happens over the roaming interface between the two participating PLMNs. When NF content or messages are exchanged between two NFs, the two NFs may belong to the same PLMN or different PLMNs. If the NFs belong to different PLMNs, the SEPP has to apply protection mechanisms to the sensitive contents of the messages or data that is exchanged.

Embodiments provide techniques for SEPPs to implement 5G SBA security, such as TLS between SEPPs in different PLMNs. A SEPP is configured with the ability and intelligence to parse the Restful APIs defined in 3GPP. The SEPP is further configured with the intelligence to distinguish a source NF and a target NF as belonging to a same PLMN or different PLMNs. If the source NF and target NF belong to different PLMNs, the SEPP protects the sensitive field before a message or other data is sent out to the IPX interconnect network connecting the different PLMNs. IEs to be protected in such messages or other data send out to the IPX interconnect network connecting the different PLMNs in some embodiments includes: the 3GPP-specific identifies of the user; identities of the NFs; IP addresses of the NFs; Permanent Subscriber Identity (SUPI) of the user; etc. The SEPP is further configured with the ability to distinguish whether a source PLMN is a 4G LTE network or a 5G Core Network, and appropriately translate or adapt the messages or other data to and from both 4G and 5G Core.

The above-described functionality for SBA security may develop over time. In some cases, the SEPP may provide for transport level TLS security between a source PLMN and a target PLMN based on Service Level Agreements (SLAs). The SEPP, however, should be configured with the ability to switch between TLS and additional security.

At a high level, various different combinations of roaming scenarios are seen, including:

a) Non Stand Alone 5G architecture (NSA)—NSA. In NSA, the core would be LTE supporting 5G radios. In the NSA 5G architecture, a 5G radio network is connected to an LTE core either directly or using Dual Connectivity methods;

b) NSA-5G and vice versa; and c) 5G-5G.

In case (a), the IPX connection between the PLMNs is secured with 4G technology.

In case (b), one NSA network would need to be able to talk to a SEPP in 5G.

In case (c), the connection between the SEPPs in the different PLMNs needs to be secured.

Described herein are techniques for handling cases (b) and (c), when a SEPP is involved. Some embodiments configured a SEPP in a manner that allows for switching between using TLS between two SEPPs and translating from SEPP to a 4G IPX entry point. The SEPP is thus configured to translate into a 4G IPX entry point. The SEPP is further configured to understand IPX data that is received from a 4G IPX entry point. The SEPP is also configured to interface between the SEPP and the 4G IPX entry point to send 5G data via 4G.

Advantageously, the full standalone 5G architecture can be used in radio and core, but if it comes to a roaming scenario, the SEPP needs to make the decision of using a TLS or a translation option to a 4G IPX connection usage.

Returning to FIG. 3, the VPLMN 310 ad HPLMN 330 may each be: (i) NSA (e.g., LTE+ 5G Radio Access Network (RAN), Evolved Packet System (EPS)(LTE) Core Network); (ii) 5G RAN, 5G Core Network; or (iii) LTE RAN, EPS(LTE) Core Network.

Figure 4:
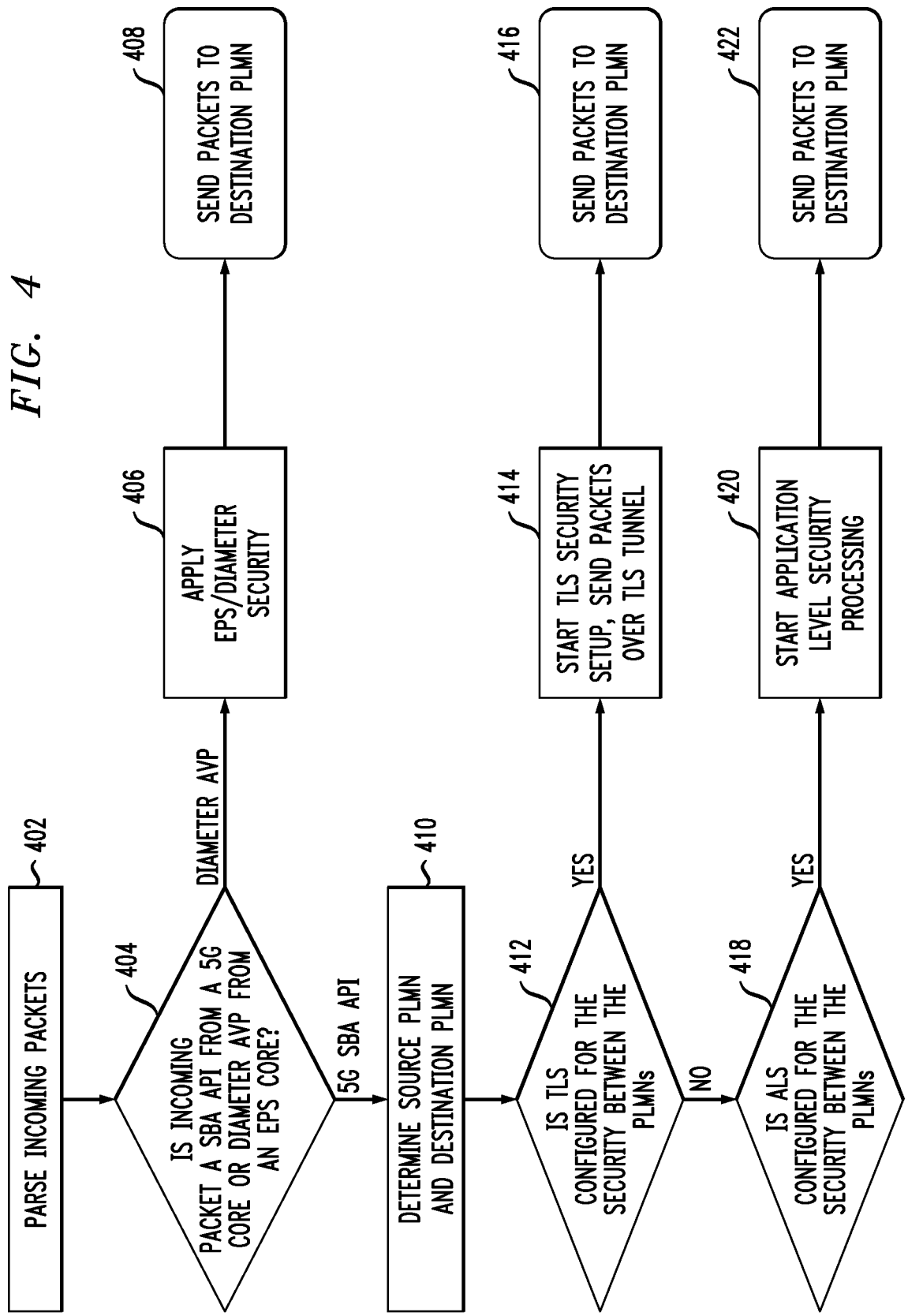
FIG. 4 illustrates a security management process of a security edge protection proxy applying one or more appropriate security operations, according to an illustrative embodiment.

FIG. 4 shows a process performed by a SEPP for parsing incoming packets to determine whether to apply security at the transport level or the application level. The SEPP may be the vSEPP for VPLMN 310 or the hSEPP for HPLMN 330 depending on the source of the messages or data to be transmitted (e.g., NFs in the VPLMN 310 or HPLMN 330). In step 404, the SEPP determines whether an incoming packet is for a 5G SBA API from a 5G Core, or a Diameter attribute-value pair (AVP) from an EPS Core. If the incoming packet is for a Diameter AVP, the SEPP in step 406 applies EPS/Diameter security and sends the packets to the destination PLMN in step 408.

If the incoming packet is for 5G SBA API, the SEPP in step 410 determines the source PLMN and the destination PLMN for the incoming packet. In step 412, the SEPP determines whether TLS is configured for security between the source PLMN and the destination PLMN of the incoming packet. If TLS is configured, the SEPP in step 414 starts TLS security setup and sends the incoming packet over a TLS tunnel. In step 416, the SEPP sends the incoming packet to the destination PLMN.

If TLS is not configured, the SEPP in step 418 determines with ALS is configured for security between the source PLMN and the destination PLMN of the incoming packet. If ALS is configured, the SEPP in step 420 starts ALS processing. In step 422, the SEPP sends the packets to the destination PLMN.

It should be emphasized that the various embodiments described herein are presented by way of illustrative example only, and should not be construed as limiting the scope of the claims. For example, alternative embodiments can utilize different communication system configurations, user equipment configurations, base station configurations, messaging protocols and message formats than those described above in the context of the illustrative embodiments. These and numerous other alternative embodiments within the scope of the appended claims will be readily apparent to those skilled in the art.

What is claimed is:

1. A method comprising:
   in a communication system comprising a first network operatively coupled to a second network, wherein the first network comprises a first security edge protection proxy element operatively coupled to a second security edge protection proxy element of the second network;
   configuring at least one of the first and second security edge protection proxy elements to determine whether to apply at least one security operation at one or more of the transport level and the application level for incoming packets based at least in part on a first network type of a source network for the incoming packets and a second network type of a destination network for the incoming packets;
   wherein determining whether to apply at least one security operation at one or more of the transport level and the application level for the incoming packets is based on whether the first network type comprises an Evolved Packet System (EPS) core network or a 5G core network.

2. The method of claim 1, wherein determining whether to apply the at least one security operation at one or more of the transport level and the application level comprises:
   determining that the first network type is the EPS core network; and
   applying EPS security to the incoming packet responsive to determining that the first network type is the EPS core network.

3. The method of claim 2, wherein the incoming packet comprises a Diameter attribute-value pair (AVP), and wherein applying EPS security comprises applying Diameter security to the incoming packet.

4. The method of claim 1, wherein determining whether to apply the at least one security operation at one or more of the transport level and the application level comprises:
   determining that the first network type is the 5G core network; and
   determining a source public land mobile network (PLMN) and a destination PLMN for the incoming packet responsive to determining that the first network type is the 5G core network.

5. The method of claim 4, wherein the incoming packet invokes a Service-Based Architecture (SBA) application programming interface (API) of the 5G core network.

6. The method of claim 4, further comprising determining whether transport layer security (TLS) is configured between the source PLMN and the destination PLMN of the incoming packet.

7. The method of claim 6, wherein the source PLMN comprises the first network and the destination PLMN comprises the second network, and further comprising:
   starting TLS setup and establishing a TLS tunnel between the first security edge protection proxy element of the first network and the second security edge protection proxy element of the second network; and
   sending the packets to the destination PLMN over the TLS tunnel between the first security edge protection proxy element of the first network and the second security edge protection proxy element of the second network.

8. The method of claim 4, further comprising:
   determining whether application level security is configured between the source PLMN and the destination PLMN of the incoming packet; and
   initiating application level security processing for the incoming packet responsive to determining that application level security is configured between the source PLMN and the destination PLMN of the incoming packet.

9. An article of manufacture comprising a non-transitory computer-readable storage medium having embodied therein executable program code that when executed by a processor causes the processor to perform the step of:
   in a communication system comprising a first network operatively coupled to a second network, wherein the first network comprises a first security edge protection proxy element operatively coupled to a second security edge protection proxy element of the second network;
   configuring at least one of the first and second security edge protection proxy elements to determine whether to apply at least one security operation at one or more of the transport level and the application level for incoming packets based at least in part on a first network type of a source network for the incoming packets and a second network type of a destination network for the incoming packets;
   wherein determining whether to apply at least one security operation at one or more of the transport level and the application level for the incoming packets is based on whether the first network type comprises an Evolved Packet System (EPS) core network or a 5G core network.

10. The article of manufacture of claim 9, wherein determining whether to apply the at least one security operation at one or more of the transport level and the application level comprises:
- determining that the first network type is the EPS core network; and
- applying EPS security to the incoming packet responsive to determining that the first network type is the EPS core network.

11. The article of manufacture of claim 9 wherein determining whether to apply the at least one security operation at one or more of the transport level and the application level comprises:
- determining that the first network type is the 5G core network; and
- determining a source public land mobile network (PLMN) and a destination PLMN for the incoming packet responsive to determining that the first network type is the 5G core network.

12. The article of manufacture of claim 11, wherein determining whether to apply the at least one security operation at one or more of the transport level and the application level further comprises determining whether transport layer security (TLS) is configured between the source PLMN and the destination PLMN of the incoming packet.

13. The article of manufacture of claim 12, wherein the source PLMN comprises the first network and the destination PLMN comprises the second network, and wherein determining whether to apply the at least one security operation at one or more of the transport level and the application level further comprises:
- starting TLS setup and establishing a TLS tunnel between the first security edge protection proxy element of the first network and the second security edge protection proxy element of the second network; and
- sending the packets to the destination PLMN over the TLS tunnel between the first security edge protection proxy element of the first network and the second security edge protection proxy element of the second network.

14. The article of manufacture of claim 11, wherein determining whether to apply the at least one security operation at one or more of the transport level and the application level further comprises:
- determining whether application level security is configured between the source PLMN and the destination PLMN of the incoming packet; and
- initiating application level security processing for the incoming packet responsive to determining that application level security is configured between the source PLMN and the destination PLMN of the incoming packet.

15. Apparatus comprising:
- in a communication system comprising a first network operatively coupled to a second network, wherein the first network comprises a first security edge protection proxy element operatively coupled to a second security edge protection proxy element of the second network;
- at least one processor coupled to a memory and configured to:
  - determine, by at least one of the first and second security edge protection proxy elements, whether to apply at least one security operation at at one or more of the transport level and the application level for incoming packets based at least in part on a first network type of a source network for the incoming packets and a second network type of a destination network for the incoming packets;
  - wherein determining whether to apply at least one security operation at one or more of the transport level and the application level for the incoming packets is based on whether the first network type comprises an Evolved Packet System (EPS) core network or a 5G core network.

16. The apparatus of claim 15, wherein determining whether to apply the at least one security operation at one or more of the transport level and the application level comprises:
- determining that the first network type is the EPS core network; and
- applying EPS security to the incoming packet responsive to determining that the first network type is the EPS core network.

17. The apparatus of claim 15, wherein determining whether to apply the at least one security operation at one or more of the transport level and the application level comprises:
- determining that the first network type is the 5G core network; and
- determining a source public land mobile network (PLMN) and a destination PLMN for the incoming packet responsive to determining that the first network type is the 5G core network.

18. The apparatus of claim 17, wherein determining whether to apply the at least one security operation at one or more of the transport level and the application level further comprises determining whether transport layer security (TLS) is configured between the source PLMN and the destination PLMN of the incoming packet.

19. The apparatus of claim 18, wherein the source PLMN comprises the first network and the destination PLMN comprises the second network, and wherein determining whether to apply the at least one security operation at one or more of the transport level and the application level further comprises:
- starting TLS setup and establishing a TLS tunnel between the first security edge protection proxy element of the first network and the second security edge protection proxy element of the second network; and
- sending the packets to the destination PLMN over the TLS tunnel between the first security edge protection proxy element of the first network and the second security edge protection proxy element of the second network.

20. The apparatus of claim 17, wherein determining whether to apply the at least one security operation at one or more of the transport level and the application level further comprises:
- determining whether application level security is configured between the source PLMN and the destination PLMN of the incoming packet; and
- initiating application level security processing for the incoming packet responsive to determining that application level security is configured between the source PLMN and the destination PLMN of the incoming packet.

* * * * *